United States Patent [19]
Shirley

[11] 3,931,742
[45] Jan. 13, 1976

[54] GYROSCOPE

[75] Inventor: Orie W. Shirley, Estacada, Oreg.

[73] Assignee: Datron Systems, Inc., Thomaston, Conn.

[22] Filed: Aug. 13, 1973

[21] Appl. No.: 387,691

[52] U.S. Cl. .................. 74/5.7; 74/785; 185/37
[51] Int. Cl.² ...................................... G01C 19/26
[58] Field of Search ............. 74/785, 5.7, 5.1, 5.12; 185/37, 39

[56] References Cited
UNITED STATES PATENTS

| | | | |
|---|---|---|---|
| 1,325,005 | 12/1919 | Dean | 74/785 |
| 1,325,010 | 12/1919 | Evans | 74/785 |
| 1,888,274 | 11/1932 | Kuhn | 74/785 |
| 2,536,395 | 1/1951 | Saunders, Jr. | 185/37 X |
| 2,911,832 | 11/1959 | Thierman | 74/5.7 |
| 2,918,869 | 12/1959 | Cumming et al. | 74/5.7 UX |
| 3,323,379 | 6/1967 | Brastow et al. | 74/5.7 X |
| 3,393,771 | 7/1968 | Lohr et al. | 185/37 |
| 3,508,447 | 4/1970 | Shirley | 74/5.1 |

Primary Examiner—Manuel A. Antonakas
Attorney, Agent, or Firm—Klarquist, Sparkman, Campbell, Leigh, Hall & Whinston

[57] ABSTRACT

A gyroscope rotor is rotated to a very high speed when a pawl is moved to release a ratchet coupled to a coil spring drive and keyed to a drive shaft. The coil spring drive then drives the rotor at a multiplied rate of speed through an arbor, planetary pinions revolved by the arbor and meshing with a fixed ring gear, a sun gear keyed to a drive shaft, the drive shaft, and hooking claw clutch teeth on the drive shaft and the rotor. When the spring reaches an unwound condition, the rotor overruns the drive shaft, the clutch teeth on the rotor cam the drive shaft axially away from the rotor, and a compression spring moves the drive shaft and a pilot pin thereon to retracted positions completely out of engagement with the rotor. A keeper bar on the pawl normally overhangs the ratchet to hold the drive shaft in clutching engagement with the rotor, and, when the pawl is released, it moves the keeper bar to a retracted position permitting axial movement of the drive shaft. Gimbal means mounting the rotor are of a tough nylon fiberglass material.

21 Claims, 6 Drawing Figures

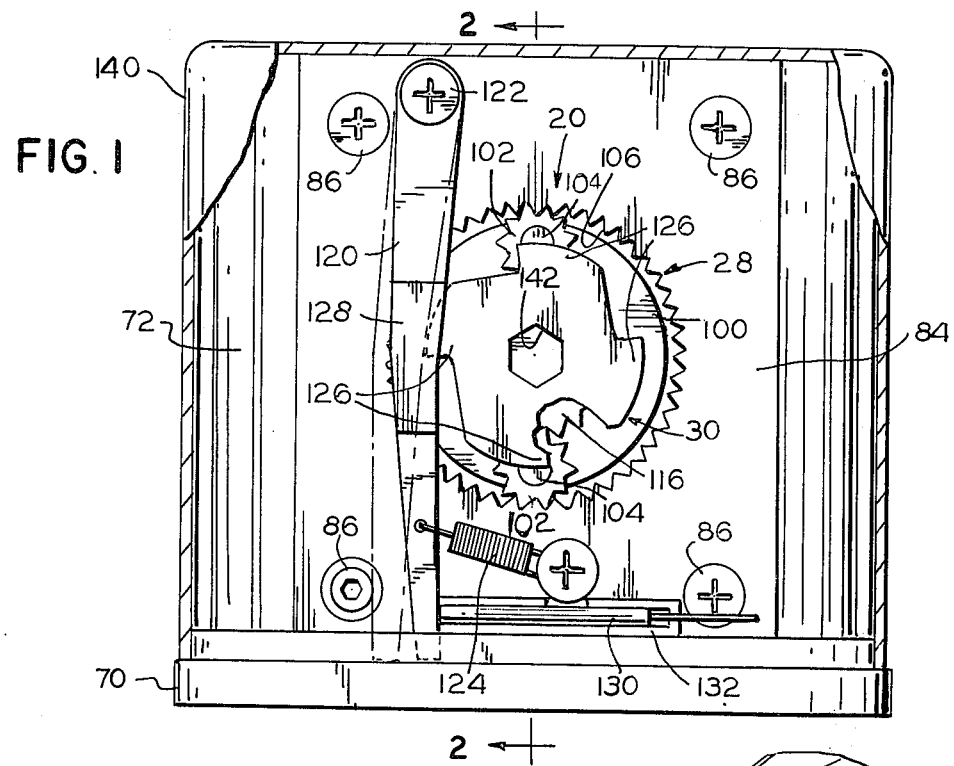
FIG. 1
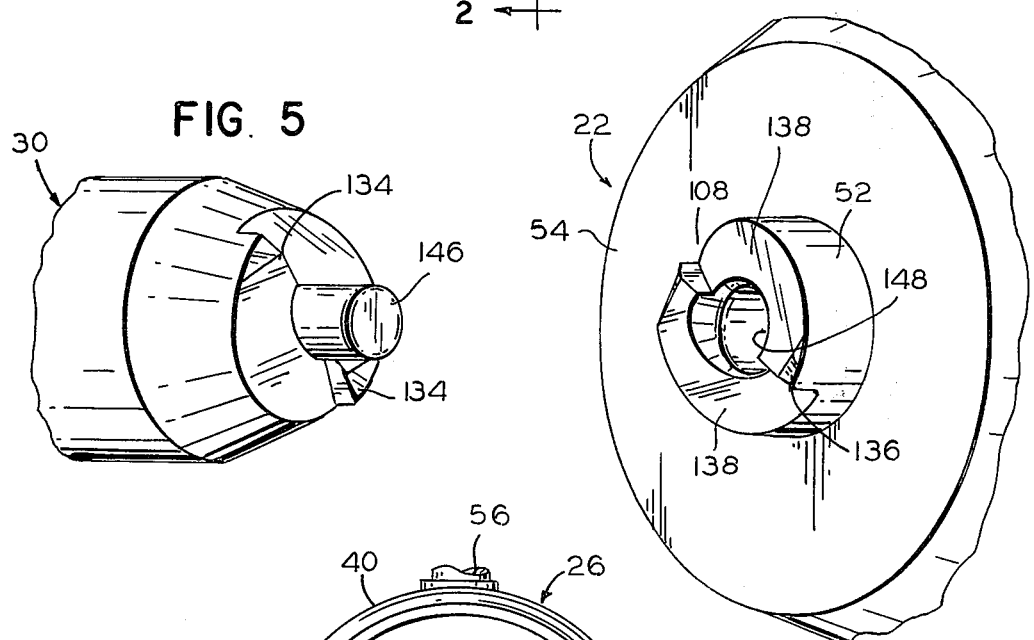
FIG. 5
FIG. 6
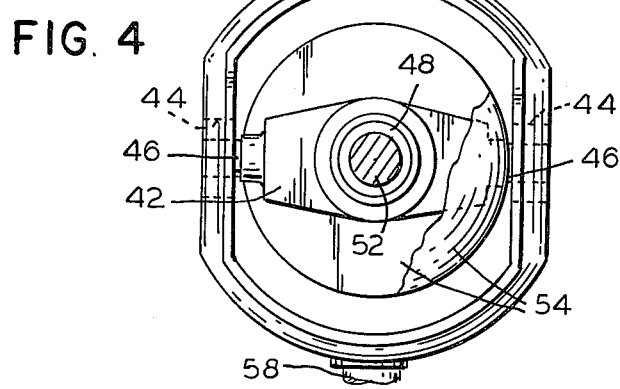
FIG. 4

GYROSCOPE

DESCRIPTION

This invention relates to an improved gyroscope, and more particularly to a speed multiplying drive for a gyroscope rotor.

An object of the invention is to provide a speed multiplying spring drive for a gyroscope rotor so that the rotor is driven at a very high speed and may be correspondingly small in size and weight.

Another object of the invention is to provide a spring drive for a gyroscope rotor wherein a coil spring drives the rotor through step-up gearing until unwound and then the rotor cams a drive shaft of the drive completely out of engagement with the rotor to free the rotor for movement in any direction.

A further object of the invention is to provide a gyroscope in which a coil spring drives a rotor through planetary gearing to rotate the rotor at a speed multiplied over the speed of unwinding of the spring whereby the rotor derives a greater proportion of the energy available in the spring.

Another object of the invention is to provide a gyroscope drive wherein a drive shaft and a rotor have a claw clutch coupling having hooking teeth which hold themselves in clutching engagement until the rotor overruns the drive shaft.

Another object of the invention is to provide a gyroscope having very tough gimbals.

Another object of the invention is to provide gyroscope gimbals composed of fiberglass reinforced nylon.

Another object of the invention is to provide a gyroscope drive in which a pawl normally engaging a ratchet keyed to a drive shaft is releasable to permit a spring to drive the shaft and in which a keeper bar on the pawl is moved by the pawl to release the shaft for axial movement out of engagement with the rotor. In the drawings:

FIG. 1 is a partially sectional side view of an improved gyroscope forming one embodiment of the invention;

FIG. 4 is a vertical sectional view taken along line 4—4 of FIG. 2;

FIG. 5 is a fragmentary, enlarged perspective view of a portion of the gyroscope of FIG. 1; and FIG. 6 is a fragmentary, enlarged perspective view of a portion of the gyroscope of FIG. 1.

Figure 2:
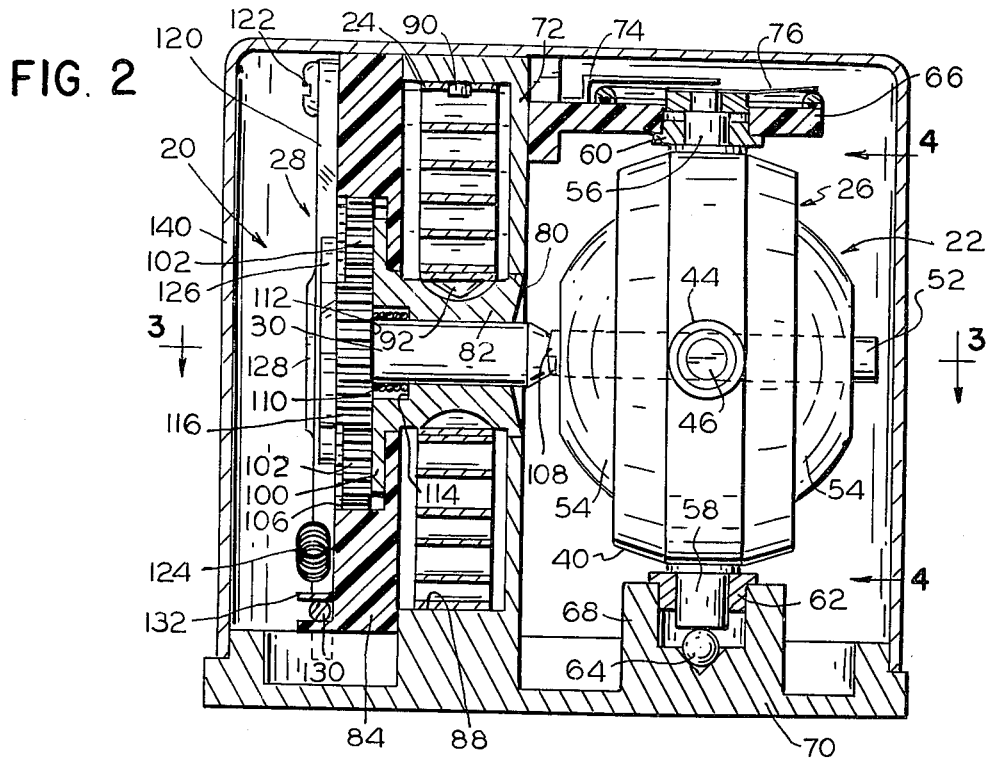
FIG. 2 is a vertical sectional view taken along line 2—2 of FIG. 1.
Figure 3:
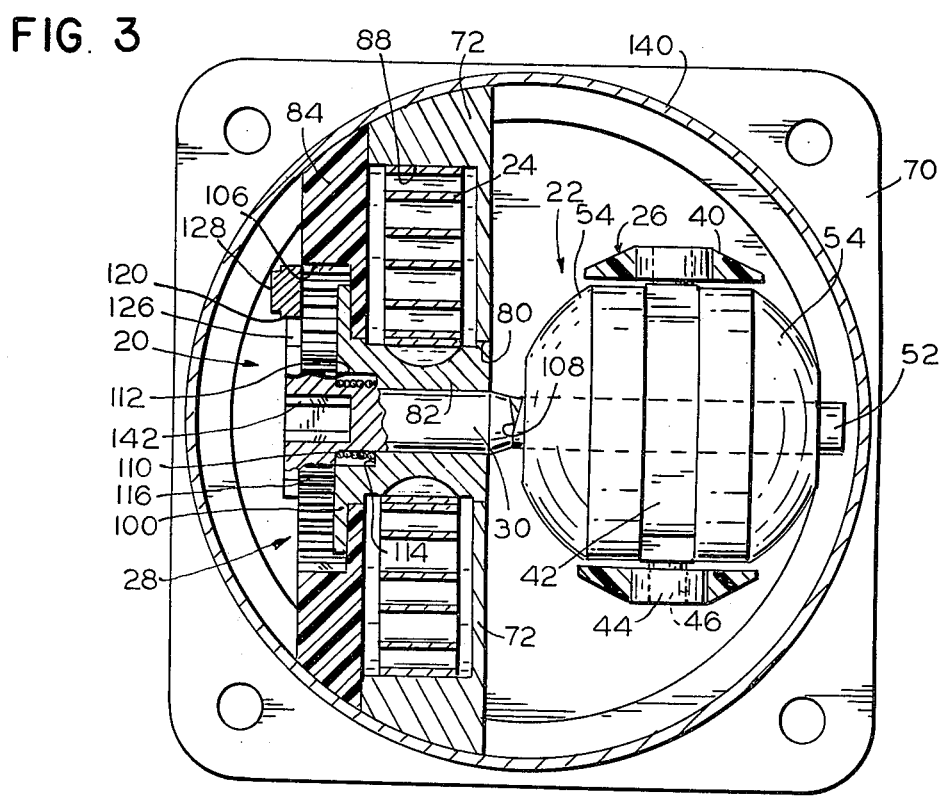
FIG. 3 is a horizontal sectional view taken along line 3—3 of FIG. 2.

Referring now in detail to the drawings, there is shown therein an improved gyroscope forming one specific embodiment of the invention and including a multiplier spring drive 20, which when triggered serves to bring a rotor 22 up to a very high rotational speed within a very short period of time not much greater than the time constant of a coil spring 24, "time constant" being used herein to designate the time in which the spring would unwind due to its own hysteresis and/or conventional loading. The drive brings the rotor up to an r.p.m. several times the r.p.m. of rotation of the drive and of the spring in so unwinding, and then the spring drive is automatically completely disengaged from the rotor 22 to permit free rotation of the rotor and free gyroscopic movement of the rotor and its mounting gimbal system 26. The multiplier spring drive 20 includes a multiplier mechanism or planetary step-up gearing 28 driving a driver shaft 30 at 3.1 times the unwinding rate of the spring.

The step-up gearing increases the load on the spring but not enough to decrease appreciably the unwinding rate of the spring. Improved "impedance matching" is achieved between the spring and rotor, making it possible to impart the same angular momentum to a small rotor as has heretofore been possible only with a larger rotor. The multiplier effect enables the rotor to have a mass much smaller than would be required if it were driven directly from a spring at an unmultiplied speed, and the smaller mass makes the gyroscope less vulnerable to damage from vibration and shock. The rotor in the particular embodiment has a diameter of about 1⅛ inches.

Another feature of the present invention is that the gimbal system 26 includes a very tough outer gimbal 40 and a very tough inner gimbal 42, both formed or injection molded nylon filled with short fibers of fiberglass, the relative proportions by weight preferably being 40% nylon and 60% fiberglass. The gimbal 40 mounts antifriction bearings 44 journalling ends 46 of the gimbal 42, and the gimbal 42 mounts antifriction bearings 48 journalling rotor shaft 52 on which are keyed rotor halves 54. Trunnions 56 and 58 are journalled in antifriction bearings 60 and 62 and the end 58 abuts a thrust bearing ball 64. The bearing 60 is mounted in a potentiometer bracket 66 also of nylon and fiberglass, and the bearing 62 and ball 64 are mounted in a boss 68 of platform base 70. The bracket 66 is detachably mounted by screws on platform upright 72 and carries potentiometer 74 having a contacting brush 76 keyed to trunnion 56. The output of the potentiometer is suitably connected by insulated wires to the usual sensing circuitry (not shown).

The platform upright 72 has a bore 80 journalling a spring arbor 82 journalled at its other end in a very tough nylon-fiberglass ring gear plate 84 secured by screws 86 to the upright and closing spring chamber or counterbore 88 formed in the upright. The outer end of the spring 24 is fixed to a pin 90 rigidly carried by the upright 72 and the inner end of the spring is formed in a hook 92 for engaging an upraised edge on arbor 82 when the spring is in tension, so the drive will release without damage to the arbor at the end of the activation time.

The arbor has a disc 100 integral therewith and carrying rotatably two planetary pinions 102 and 104. The pinions mesh with a ring gear 106 formed in the ring gear plate 84. The arbor 82 rotatably and axially slidably mounts the driver shaft 30 which is biased toward disengagement from coupling end portion 108 of the rotor shaft 52 by a compression spring 110 bearing against collar portion 112 of the driver shaft 30 and the bottom of counterbore 114 in the arbor 82. A sun gear 116 integral with the driver shaft meshes with the pinions 102 and 104.

A latching pawl 120 (FIG. 1) is pivotally mounted by a screw 122 on the ring gear plate 84 and is held by the screw against any movement outwardly from the ring gear plate. A tension spring 124 biases the pawl into latching engagement with an adjacent one of ratchet teeth 126 integral with the sun gear 116 to keep the spring 24 wound up. When the pawl is in its latching position, a keeper bar 128 integral with the pawl overhangs the tip end of the adjacent ratchet tooth 126 to hold, against the action of the compression spring 110, the driver shaft 30 in coupled engagement with the end portion 108 of the rotor shaft 52.

A trigger mechanism 130 mounted in guide 132 on the plate 84, when actuated, pushes the pawl 120 against the bias of spring 124 to a position out of engagement with the ratchet teeth 126, retracting the keeper bar 128 to free the driver shaft 30 for movement by the spring 110 completely out of engagement with the rotor shaft 52. However, overrunning clutch teeth 134 of the driver shaft and complementary overrunning clutch teeth 136 of the rotor shaft are hookingly inclined from 9° to 11° to prevent axial movement of the driver shaft by the spring 114 until the spring 24 has unwound and the shaft 52 overruns the driver shaft 30. When this occurs, camming portions 138 on the rotor shaft push the driver shaft out of hooking engagement with the rotor shaft, and the spring 114 moves the driver shaft farther to a completely retracted position in which the ratchet end of the shaft engages cup-like cover 140.

The driver shaft 30 has a hexagonal or allen head screw socket 142 therein for receiving a hexagonal driver (not shown) for winding up the coil spring 24. The hexagonal driver, in the winding, is bottomed in the socket 142 and is pushed axially to keep the spring 114 from moving the driver shaft 30 out of coupled engagement with the rotor shaft 52, the ratchet teeth 126 clearing the keeper bar 4 times each revolution of the driver shaft. A pilot pin 146 on the driver shaft 30 enters a complementary bore 148 in the rotor shaft 52 to keep the rotor aligned with the driver shaft prior to the driving of the rotor shaft up to operating speed of, for example, 27,000 r.p.m.

According to the present invention there is provided a gyroscope which is very compact in size and which may employ a fairly small rotor achieving the angular momentum of a larger rotor by means of a multiplication of speed between the spring drive and the rotor shaft. The multiplier gearing brings about an "impedance match" between spring and rotor whereby greater energy is coupled to the rotor than would be possible in the case of the usual, prior-art straight connection. The smaller rotor and resulting smaller gimbal system achieves resistance against G stresses adapting the same for advantageous utilization in an aircraft, missile or the like.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. In a gyroscope,
   gyroscopic rotor means of a predetermined light weight,
   gimbal means mounting the rotor means for rotational movement,
   spring motor drive means including a spring adapted to be wound,
   and coupling means for releasably coupling said spring motor drive means in driving relation to said rotor means for bringing said rotor means up to a desired speed,
   said coupling means including step-up gearing means for rotating said rotor means at a speed greater than the unwinding speed of said spring so that the rotor means has a high angular momentum despite its lightness in weight, the weight of said rotor means being lighter than would be required to attain a given angular momentum without said step-up gearing.

2. The gyroscope of claim 1 wherein said coupling means comprises a rigid ring gear, planetary pinions driven by said spring, and a sun gear releasably coupled to said rotor means.

3. In a gyroscope,
   gyroscopic rotor means,
   gimbal means mounting the rotor means for rotational movement,
   spring motor drive means including a spring adapted to be wound,
   step-up gearing means drivingly connected to the drive means,
   overrunning clutch means normally coupling the gearing means to the rotor means and completely disengaging the rotor means from the gearing means when overrunning of the rotor means relative to the gearing means occurs,
   and releasable means normally holding the drive means in a fully wound condition and releasable to permit the spring to unwind.

4. The gyroscope of claim 3 wherein the overrunning clutch means includes a driving shaft splined to the step-up gearing means, interengageable claw clutch means on the rotor means and the shaft adapted to cam apart and cam the shaft toward a retracted position when such overrunning occurs, and holdout means for holding the shaft in its retracted position to permit free rotation and gyroscopic movement of the rotor means.

5. The gyroscope of claim 4 wherein the holdout means comprises a spring.

6. The gyroscope of claim 3 wherein the overrunning clutch means includes a claw type clutch having teeth which hook together when the gearing means is driving the rotor means, and disengaging means for moving the teeth apart when such overrunning occurs.

7. The gyroscope of claim 6 wherein the disengaging means comprises camming portions on the teeth.

8. The gyroscope of claim 7 wherein the disengaging means also includes a spring adapted to hold the teeth apart.

9. The gyroscope of claim 6 wherein the disengaging means includes a spring of a strength insufficient to move the teeth apart while the teeth are hooked together and sufficient to move the teeth apart when there is no hooking.

10. In combination,
    a rotary driven member,
    a rotary driving member,
    means mounting the driving member in alignment with the driven member and movable axially toward and away from the driving member,
    the members having overrunning clutch portions on the ends thereof,
    means biasing the driving member away from engagement with the driven member to a retracted position out of engagement with the driven member,
    a windable spring drive,
    ratchet means for locking the spring drive in wound condition,
    step-up gearing means coupling the spring drive to the driving member, releasable latch means for holding the driving member in engagement with the driven member against the action of the biasing means, means for releasing the ratchet means, and means for releasing the releasable latch means to permit the biasing means to move the driving member to its retracted position.

11. The combination of claim 10 wherein the overrunning clutch means has teeth which hook while the driving member is driving the driven member and which unhook when overrunning of the driven member starts, the biasing means serving to move the teeth apart when unhooking occurs.

12. The combination of claim 11 wherein the latch releasing means operates at the same time as the ratchet releasing means.

13. The combination of claim 12 wherein the ratchet means includes a pawl and a ratchet, the releasable latch means including a keeper member carried by the pawl and movable therewith.

14. In a gyroscope, gimbal means, a rotor mounted rotatably by the gimbal means and including a rotor shaft having overrunning clutch teeth on one end thereof, a drive shaft having overrunning clutch teeth on one end thereof, a ratchet fixed to the drive shaft, platform means mounting the gimbal means and also mounting the drive shaft for rotary movement and for axial movement between a drive position in which the clutch teeth of the shafts are in driving engagement and a retracted position in which the drive shaft is completely disengaged from the rotor shaft, a compression spring engaging the platform means and the drive shaft and urging the drive shaft toward its retracted position, a windable coil spring mounted by the platform means, coupling means connecting the drive end of the coil spring to the shaft, releasable pawl and ratchet means normally holding the coil spring against unwinding, means for releasing the pawl and ratchet means to permit the coil spring to unwind and drive the shafts, keeper means normally holding the drive shaft in its drive position, and means for actuating the keeper means to release the drive shaft to permit the compression spring to move the drive shaft out of engagement with the rotor shaft when the coil spring is unwound.

15. The gyroscope of claim 14 wherein the clutch teeth are claw clutch teeth having hooking portions and the means for actuating the keeper means to release the drive shaft releases the drive shaft when the pawl and ratchet means is released.

16. The gyroscope of claim 15 wherein the pawl and ratchet means includes a ratchet keyed to the drive shaft and a pawl and the keeper means is a keeper member carried by the pawl between a position overhanging the ratchet and a position clearing the ratchet.

17. The gyroscope of claim 16 wherein the coupling means comprises a ring gear rigid on the platform means, planetary pinions driven by the spring, and a sun gear keyed to the drive shaft.

18. The gyroscope of claim 14 wherein the coupling means comprises a ring gear fixed to the platform, a sun gear keyed to the drive shaft and planetary pinions revolved by the coil spring and meshing with the ring gear and the sun gear.

19. The gyroscope of claim 14 wherein the shafts have a pilot pin and pilot bore to facilitate clutching engagement between the shafts.

20. The gyroscope according to claim 14 wherein said gimbal means are formed of fiberglass and nylon.

21. In a gyroscope, gyroscope rotor means, gimbal means mounting the rotor means of rotational movement, spring motor drive means including a spring adapted to be wound, and overrunning clutch means normally coupling the spring motor drive means to the rotor means and completely disengaging the rotor means when overrunning of the rotor means relative to the drive means occurs, said overrunning clutch means including a claw type clutch having teeth which hook together when the spring motor drive means is driving the rotor means, and including disengaging means for moving the teeth apart when such overrunning occurs.

* * * * *